United States Patent
Kolb et al.

(10) Patent No.: US 6,464,613 B1
(45) Date of Patent: Oct. 15, 2002

(54) POWER-SHIFTABLE COMPOUND PLANETARY TRANSMISSION

(75) Inventors: Marshall Kolb, Overland Park, KS (US); Darrell L. Durham, Lee's Summit, MO (US)

(73) Assignee: Eskridge Engineering, Inc., Olathe, KS (US)

( * ) Notice: Subject to any disclaimer, the term of this patent is extended or adjusted under 35 U.S.C. 154(b) by 0 days.

(21) Appl. No.: 09/870,362

(22) Filed: May 30, 2001

(51) Int. Cl.⁷ ................................................. F16H 3/48
(52) U.S. Cl. ........................ 475/296; 475/339; 475/293
(58) Field of Search ................................. 475/329, 337, 475/338, 339, 340, 293, 296

(56) References Cited

U.S. PATENT DOCUMENTS

| | | | |
|---|---|---|---|
| 2,369,422 A | * | 2/1945 | Williams .................... 475/338 |
| 2,440,613 A | * | 4/1948 | Orr ............................. 475/293 |
| 2,603,327 A | * | 7/1952 | King .......................... 475/296 |
| 3,090,258 A | * | 5/1963 | Zing et al. .................. 475/338 |
| 3,375,738 A | * | 4/1968 | Love ........................... 475/296 |
| 3,721,135 A | * | 3/1973 | Kelley ........................ 475/340 |
| 3,754,604 A | | 8/1973 | Inaba et al. |
| 3,756,330 A | | 9/1973 | Russell, Jr. |
| 3,789,931 A | | 2/1974 | Quinn |
| 3,972,375 A | | 8/1976 | Deeter et al. |
| 4,148,366 A | | 4/1979 | Beckstrom et al. |
| 4,160,456 A | | 7/1979 | Hawkins et al. |
| 4,392,391 A | | 7/1983 | Jameson et al. |
| 4,430,911 A | | 2/1984 | Morscheck |
| 4,584,903 A | | 4/1986 | Hirt et al. |
| 4,658,662 A | | 4/1987 | Rundle |
| 4,726,246 A | | 2/1988 | Whalen |
| 4,751,971 A | | 6/1988 | Thompson |
| 4,777,837 A | | 10/1988 | Lehle |
| 5,447,081 A | | 9/1995 | Brunazzi |
| 5,489,013 A | | 2/1996 | Buuck et al. |
| 5,554,082 A | * | 9/1996 | Umeyama et al. .......... 475/338 |
| 5,660,504 A | | 8/1997 | Reinert, Sr. |
| 5,855,530 A | * | 1/1999 | Huang et al. ................ 475/339 |

FOREIGN PATENT DOCUMENTS

| | | | | |
|---|---|---|---|---|
| DE | 1191656 | * | 4/1965 | ................. 475/339 |
| SU | 1216035 | * | 3/1986 | ................. 475/296 |

* cited by examiner

Primary Examiner—Charles A. Marmor
Assistant Examiner—Ha Ho
(74) Attorney, Agent, or Firm—Shook, Hardy & Bacon L.L.P.

(57) ABSTRACT

A device and method for shifting the operating speed of a machine while under load. The machine includes a casing, an input and output shaft. The device includes a clutch mechanism, a primary carrier, a cluster gear, a ring gear, a first and second gear. The clutch mechanism is operably associated with the input shaft. The primary carrier is operably coupled to rotate the output shaft. The cluster gear is rotatably coupled to the primary carrier. The first gear is rotatably mounted within the casing and second gear is rotatably mounted on the first gear. The first and second gear are in mesh with the cluster gear. The cluster gear is adapted to rotate around the first and second gears on primary carrier when one of the first gear and the second gear is engaged thereby rotating the output shaft at the operating speed corresponding to the engaged gear.

23 Claims, 5 Drawing Sheets

POWER-SHIFTABLE COMPOUND PLANETARY TRANSMISSION

STATEMENT REGARDING FEDERALLY SPONSORED RESEARCH OR DEVELOPMENT

Not Applicable.

CROSS-REFERENCE TO RELATED APPLICATIONS

Not Applicable.

FIELD OF INVENTION

This invention relates to a shiftable compound planetary transmission. More particularly, this invention relates to a two-speed compound planetary transmission that provides for shifting while under load and includes a set of drive gears that are in constant mesh with cluster gears that rotate around the drive gears during operation.

BACKGROUND OF INVENTION

It is well known that various types of motors and transmissions are used in auger drive systems to change the rate at which augers bore holes into the ground. Auger systems are mounted on the end of a boom and above the drill bit. Two-speed drives are desirable for earth boring applications. Low speeds and high torque is used for boring through the ground and high speeds and low torque is used to spin-off or clean the drill bit after digging is complete.

One type of auger drive system changes operational speeds by the use of a two-speed motor and a one-speed transmission. In this configuration, the speed of the motor is selectively adjusted between two speeds to adjust the operational speed of the augers, while gear ratio in the transmission remains constant. This type of transmission system is more than twice the weight and larger than a one-speed motor. The weight and size of the two-speed motor makes it more difficult for an operator to control the end of the boom when positioning the drill bit over a desired location. Not only is it difficult to control the end of the boom, some auger machines simply cannot support the weight and size of a two-speed system.

Another type of auger drive system shifts speeds through the use of a one-speed motor and a two-speed transmission. In this construction, the speed of the motor remains constant and the gears in the transmission are shifted between two gear sets to change the operational speed of the auger. In some prior art devices, the gear sets are not in constant mesh, therefore the gears must be stopped and manually shifted to change gear sets. If the gears are not stopped prior to shifting, the gear teeth will grind against each other causing the gear teeth to wear down and/or break. Various types of lock-out prevention hydraulic circuitry is used on these types of devices to prevent inadvertent shifting while the gears are still in motion. This transmission system is inefficient due to the continual stopping and starting of the auger that is necessary to change gears.

There are other types of systems that utilize one-speed motor and multiple-speed transmissions that have gears that are in constant mesh. For example, U.S. Pat. No. 4,777,837 to Lehle includes a plurality of gear sets that are mounted on two fixed parallel shafts that are in constant mesh with gears mounted on a drive shaft. Although the gears are in constant mesh, the system requires synchromesh couplings in conjunction with a clutch mechanism to change gear sets. This system is inefficient in that a two-step process is required to change gear sets in addition to the parallel shafts that are fixedly mounted to the housing which reduces the power output potential.

In addition, U.S. Pat. No. 5,489,013 to Buuck et al. discloses a system that includes a plurality of gears sets that are in constant mesh. This system allows for some planetary motion, but does not utilize compound epicyclic gearing. Further, a set of various sized clutch packs are included, but again, this device does not utilize compound epicyclic gearing. This multi-piece construction is complex and difficult to assemble.

Accordingly, there remains a need for a power-shiftable transmission, such as an auger drive which overcomes the above drawbacks and deficiencies. More specifically, there remains a need for a transmission for an auger that is of a simple construction and easy to install on an auger. In addition, there remains a need for a transmission that allows for a simplified construction for shifting between gears while under loading. Further, there remains a need for a transmission that allows for gears to rotate around a primary drive shaft to increase the power output potential. There is also a need for a transmission that has a reduced weight and size so that the auger machine can support such a system on the end of a boom. The objective of this invention is to solve or substantially reduce the problems normally associated with known prior art transmission systems for auger drives and other devices.

SUMMARY OF INVENTION

Accordingly, in one of its aspects, the present invention provides a power transmission device for shifting the operating speed of a machine.

In another of its aspects, the present invention provides a device for shifting the operating speed of a machine while under load.

In still another of its aspects, the present invention provides a method for shifting the operating speed of a machine through the use of a transmission device.

According to the present invention, the foregoing and other objects are achieved by a power transmission device for shifting the operating speed of a machine while under load. The machine generally includes a casing, an input and an output shaft. The device includes a clutch mechanism, a primary carrier, a cluster gear, a ring gear, a first gear and a second gear. the clutch mechanism is operably associated with the input shaft. The primary carrier is located within the casing and operably coupled to rotate the output shaft. The cluster gear is rotatably coupled to the primary carrier. The ring gear is coupled to the casing and is in mesh with the cluster gear. The first gear is rotatably mounted within the casing and is in mesh with the cluster gear. The second gear is rotatably mounted on the first gear and is in mesh with the cluster gear. The cluster gear is adapted to rotate around the first and second gears when one of the first gear and the second gear is engaged thereby rotating the output shaft at the operating speed corresponding to the engaged gear.

The invention further provides a device for shifting the operating speed of a machine while under load. The machine generally includes a casing, an input and an output shaft. The device includes a cluster gear, a first gear, a second gear, an engaging means and a means for allowing the cluster gear to rotate around the first and second gear. The cluster gear is rotatably coupled to the casing and associated with the output shaft. The first gear is rotatably mounted within the casing and is in mesh with the cluster gear. The second gear is rotatably mounted on the first gear and is in mesh with the cluster gear. The engaging means is operably associated with the input shaft and adapted to selectively engage either the first or second gear. The present invention includes means that allows for the cluster gear to rotate around the first and second gears. One of the first gear and the second gear is engaged thereby rotating the output shaft at the operating speed corresponding to the engaged gear.

The present invention further provides a method for shifting the operating speed of a machine through the use of a transmission device. The machine includes a casing, an input shaft and an output shaft. The device includes a primary carrier, a cluster gear, a ring gear, a first gear and a second gear. The primary carrier is located within the casing and operably coupled to rotate the output shaft. The cluster gear is rotatably coupled to the primary carrier. The ring gear is coupled to the casing and is in mesh with the cluster gear. The first gear is rotatably mounted within the casing and is in mesh with the cluster gear. The second gear is rotatably mounted on the first gear and is in mesh with the cluster gear. The clutch mechanism is adapted to selectively engage one of the first gear and the second gear, and wherein the cluster gear is adapted to rotate around the first and second gears when one of the first gear and the second gear is engaged thereby rotating the output shaft at the operating speed corresponding to the engaged gear. The method comprises rotating the input shaft, engaging the clutch with one of the first gear and second gear, rotating the cluster gear around the first and second gears and rotating the output shaft at the operating speed corresponding to the engaged gear.

Additional objects of invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means and instrumentalities and combinations particularly pointed out in the appended claims.

BRIEF DESCRIPTION OF THE DRAWINGS

In the accompanying drawings which form a part of the specification are to be read in conjunction therewith and in which like reference numerals are employed to indicate like parts in the various views.

DETAILED DESCRIPTION OF THE PREFERRED EMBODIMENT

The present invention is directed to a power-shiftable compound planetary transmission that shifts between gears while under load. The particular embodiments described herein are intended in all respects to be illustrative rather than restrictive. Alternative embodiments will become apparent to those skilled in the art to which the invention pertains without departing from its scope.

Figure 1:
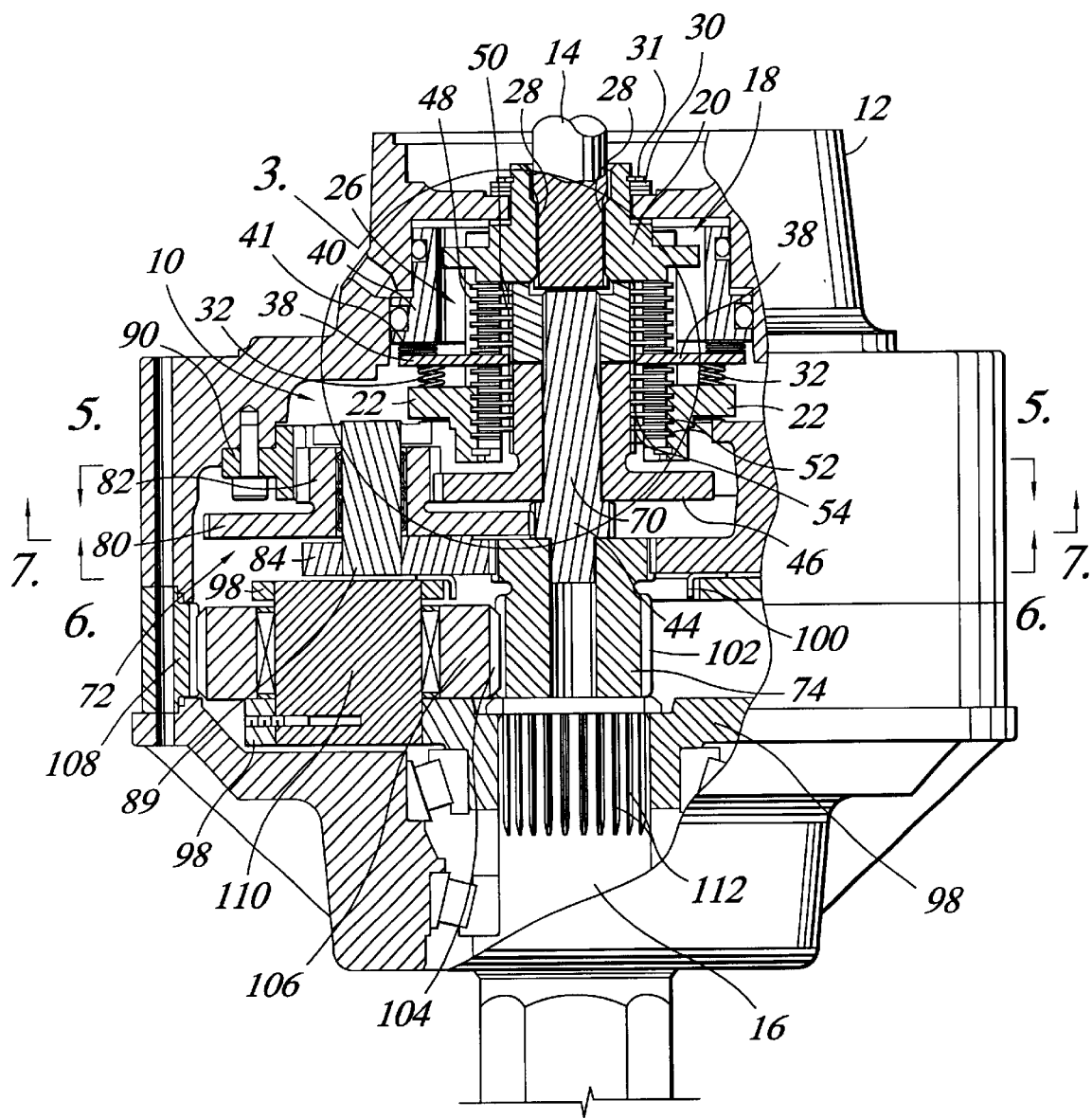
FIG. 1 is a fragmentary view of an auger transmission casing showing the present invention mounted therein.

Referring to the drawings in greater detail, and initially to FIG. 1, an exemplary power-shiftable compound planetary transmission device employing the principles of the present invention is shown and broadly designated in the drawings by reference numeral 10. In its most basic configuration, device 10 is mounted on the end of the auger boom or on another type of machine that requires shifting between gears, and is mounted within a transmission casing 12. An input shaft 14 operates to transfer power from a motor, not shown, mounted on the auger to device 10. Device 10 transfers the power through a selected power path to an output shaft 16. Device 10 preferably has two speeds in forward and reverse.

As best seen in FIG. 1, casing 12 is a shell that encloses device 10 to protect it from harsh environmental conditions. This type of casing 12 is well known in the art and need not be discussed any further. Input shaft 14 is typically cylindrical and enters from the top portion of casing 12. Shaft 14 is preferably driven by a one-speed motor, not shown, that operates to rotate shaft 14 at a selected rate of speed. A plurality of splines, not shown, are formed on the distal end of shaft 14 and are adapted to engage a housing 18.

Figure 2:
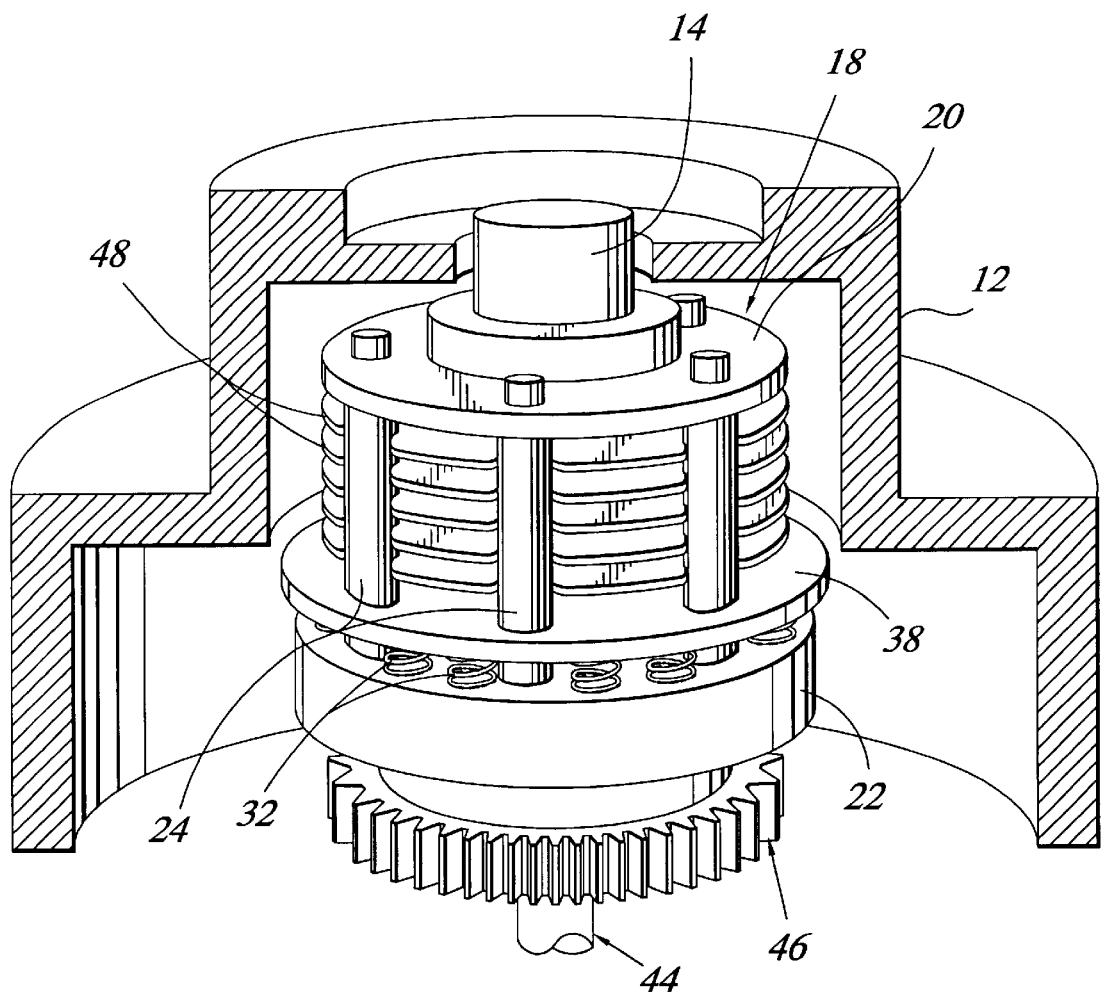
FIG. 2 is front perspective view of a portion of the present invention not including the cluster gear.

Housing 18 is preferably formed of steel and includes top and bottom portions 20, 22 that are disc-shaped as illustrated in FIGS. 1 and 2. Top portion 20 is fastened to bottom portion 22 by a series of upstanding posts 24 that are positioned equidistantly around the circumference of the top and bottom portions 20, 22. Posts 24 are also used to engage a portion of the clutch mechanism 26 which will be more fully described below. Top portion 20 includes a circular aperture formed through its center and sized to accept shaft 14. A plurality of splines 28 are formed in the aperture and are sized to mesh with the splines on the end of shaft 14 so that housing 18 rotates along with shaft 14 as the motor rotates shaft 14. Further a thrust bearing 30 is placed on the top portion of casing 12 and serves as a support for a retaining ring 31. Retaining ring is coupled to top portion 20 and is adapted to prevent housing from sliding downwardly into casing 12.

As best seen in FIGS. 1 and 2, clutch mechanism 26 is operably associated with input shaft 14 and is used to engage one of the gears in device 10. Clutch mechanism 26 includes a selector plate 38, springs 32 and rotors 48, 50, 52, 54. Springs 32 have first and second ends. First end of the springs 32 are fixedly mounted on bottom portion 22 of housing 18 and extend upwardly toward the top portion 20 of housing 18. Second end of the springs 32 are used to support a selector plate 38. Selector plate 38 is an annular ring that is preferably formed of steel but could also be any other type of reliant rigid type of material such as but not limited to plastic, aluminum or the like. Plate 38 is mounted on the second ends of springs 32 and positioned between top and bottom portions 20, 22 of housing 18. Springs 32 operate to apply an upward bias on selector plate 38. An actuating device 40, preferably a hydraulic piston, is selectively activated to apply downward force on plate 38 to change gears in device 10 which will be more fully described below. It will be understood and appreciated that the principles of the present invention apply equally to other types of actuating devices including, but not limited to, a pneumatic piston or any other mechanical device that operates to counteract the bias imposed by springs 32 and move selector plate 38 downward to change gears 44, 46. Actuator device 40 is coupled to plate 38 by a set of bearings 41 which allow plate 38 to rotate while the actuator device 40 remains fixedly coupled to casing 12. It is also within the scope of this invention to eliminate springs 32 and mechanically move selector plate 38 to engage one of gears 44, 46 or to move selector plate 38 to a neutral position where neither gear 44, 46 is engaged.

Clutch mechanism 26 further includes four sets of rotors 48, 50, 52, 54 that are engaged by selector plate 38 to shift between first and second gears 44, 46. As best seen in FIGS. 1–4, rotors 48, 50, 52, 54 are ring-shaped and preferably formed of steel but could be any other type of resilient type of metal. First and third sets of rotors 48, 52 each include six individual rotors that are coupled to housing 18. In addition second and fourth sets of rotors 50, 54 include five individual rotors that are adapted to engage with rotors 48, 52. It should be understood that it is not necessary for rotors 48, 52 to include six individual rotors and it is not necessary for rotors 50, 54 to include five individual rotors. It is within the present invention to include more or less than the aforementioned number of individual rotors in each of the rotor sets 48, 50, 52, 54 so long as the number of individual rotors is adequate for engaging housing 18 with either first or second gear 44, 46.

First and second sets of rotors 48, 50 are positioned between the top portion 20 of housing 18 and selector plate 38. Specifically, as best seen in FIG. 2, first set of rotors 48 have a plurality of curved indentations on the outer circumference of each ring sized to fit the curvature of posts 24. Posts 24 are used to couple rotors 48 to housing 18 so that rotors 48 rotate at the same rate of speed as housing 18. Referring back to FIG. 3, second set of rotors 50 have a slightly smaller diameter than the first set of rotors 48. Each of the second set of rotors 50 are positioned between each of the first set of rotors 48 to form an alternating pattern between first and second rotors 48, 50. The inner circumference of rotors 50 have teeth-like grooves sized to engage an input adapter 56 which will be more fully described below. Additionally, a friction material 58 is preferably bonded to rotors 48 and/or rotors 50 to allow for a removable connection between the rotors 48, 50 when selector plate 38 is in the upward position engaging first gear 44.

A third and fourth set of rotors 52, 54 are of similar construction to first and second rotors 48, 50 respectively, but are positioned between selector plate 38 and bottom portion 22 of housing 18. Third set of rotors 52 have curved indentations on the outer circumference of each ring sized to fit the curvature of posts 24. Posts 24 are used to couple rotors 52 to housing 18 so that rotors 52 rotate along with housing 18. Fourth set of rotors 54 have a slightly smaller diameter than third set of rotors 52. Each of the fourth set of rotors 54 are positioned between each of the third set of rotors 52 to form an alternating pattern between third and fourth rotors 52, 54. The inner circumference of rotors 54 has teeth-like grooves sized to engage with second gear 46. Additionally, a friction material 59 is bonded to rotors 52 and/or rotors 54 to allow for a removable connection between the rotors 52, 54 when selector plate 38 is in the downward position engaging second gear 46. Friction material 58, 59 is preferably formed of a bronze gripping material, but it should be understood that other types of materials such as, but not limited to, metals and paper made with gripping material may be used. It is also within the scope of this invention to use friction material 58, 59 that is independent and not bonded to rotors 48, 52 respectively. Further, retaining members 60 are mounted to the lower end of the bottom portion 22 to hold third and fourth rotors 52, 54 in place and preventing them from being dislodged from housing 18.

Input adapter 56 is used to couple the second set of rotors 50 with first gear 44. Adapter 56 is a ring-shaped member having outer circumferential splines 62 and inner circumferential splines that are not shown. Splines 62 are sized to fit within the grooves formed on the inner circumference of second rotors 50. Splines on the inner circumferential edge are sized to engage with the splines 66 formed on first gear 44. Therefore, rotors 50, adapter 56 and first gear 44 are all coupled so they rotate in unison.

First gear 44 is rotatably mounted within casing 12 and is in mesh with cluster gear 72. As best seen in FIGS. 1 and 7, first gear 44 includes splines 66 and gear teeth 68 positioned on a top and bottom portion of a shaft 70 respectively. As stated above, splines 66 are positioned on the top of shaft 70 and are adapted to engage with the inner splines, not shown, on adapter 56. Gear teeth 68 extend radially from the bottom portion of shaft 70 and the distance between the ends of opposing gear teeth 68 on first gear 44 have a larger diameter than the diameter of shaft 70 as seen in FIG. 7. Further, gear teeth 68 are adapted to engage with cluster gears 72 which will be more fully described below. The bottom portion of shaft 70 is rotatably mounted to and rests on the top portion of a sun gear 74 as seen in FIGS. 1 and 6.

Figure 3:
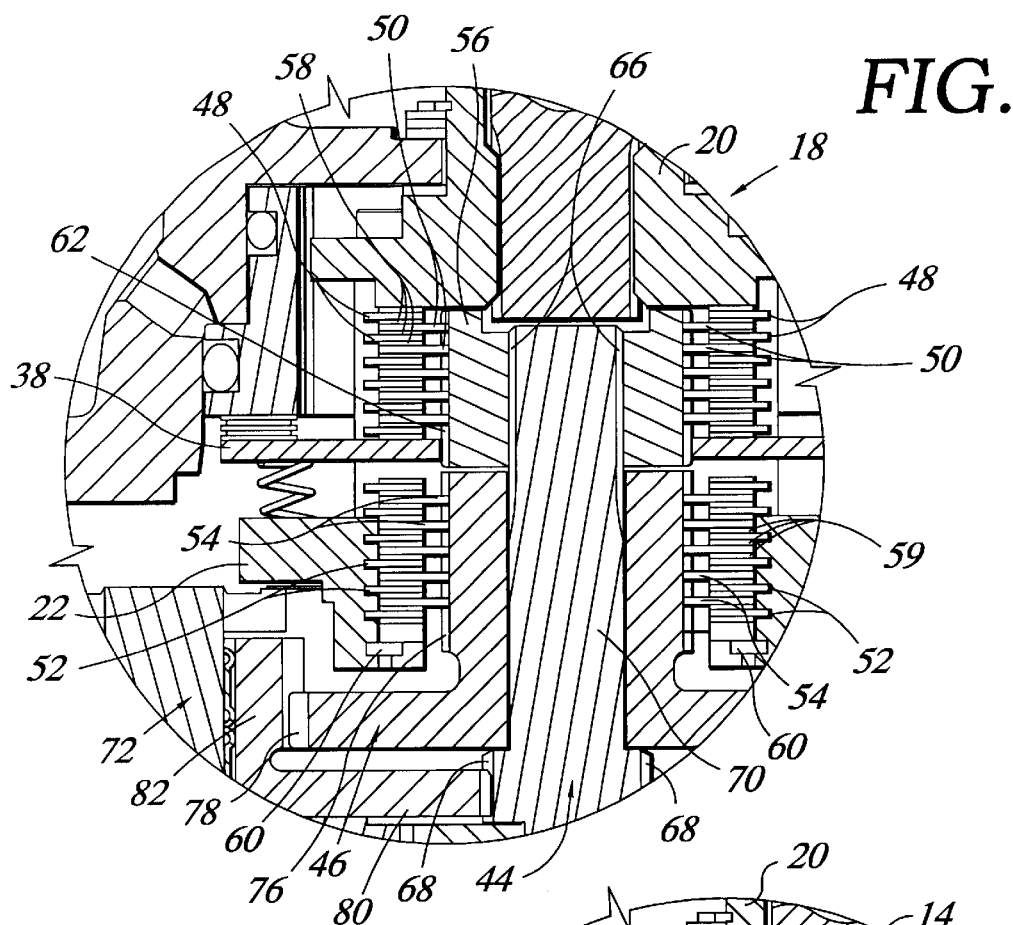
FIG. 3 is an enlarged view taken from FIG. 1 showing the clutch mechanism engaging the first gear.
Figure 5:
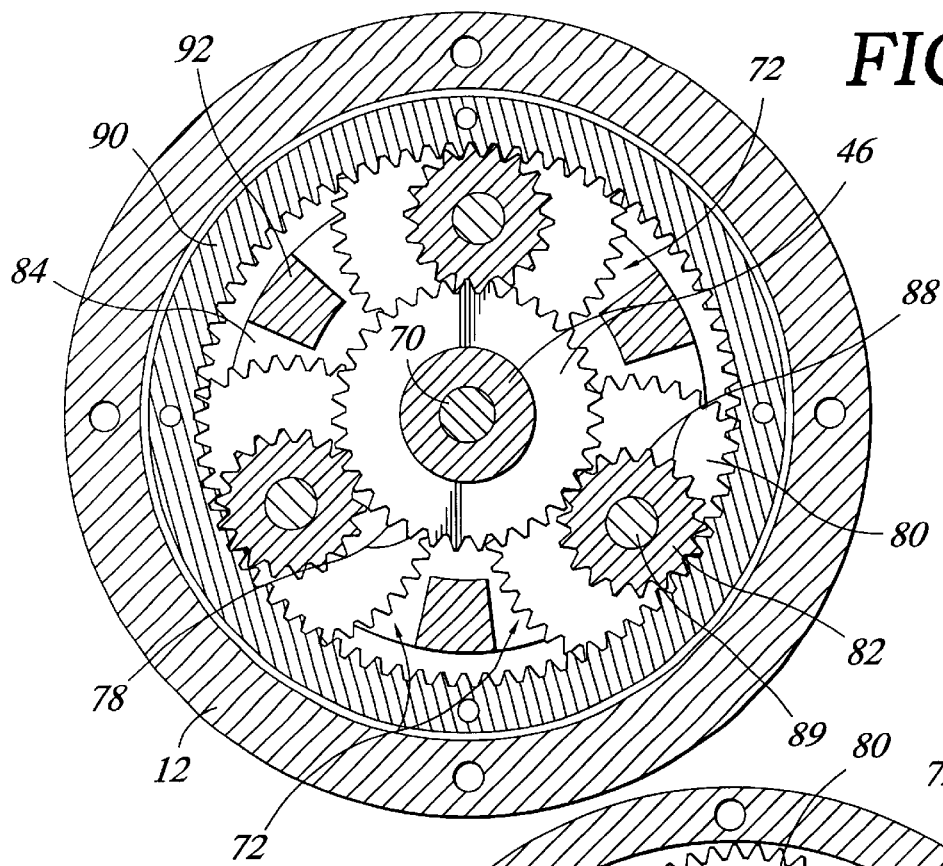
FIG. 5 is a cross-sectional view of the present invention taken along line 5—5 of FIG. 1 showing the second gear and the ring gear in mesh with the small gear.

Second gear 46 is rotatably mounted on first gear 44 and is in mesh with cluster gear 72. As best seen in FIGS. 1, 3 and 5, second gear 46 is a sleeve-type member that is rotatably mounted around the outer circumference of the shaft 70 of first gear 44. Specifically, splines 76 and gear teeth 78 are formed on the top and bottom portion of second gear 46 respectively. Splines 76 are adapted to engage with the grooves formed in the inner circumference of fourth rotors 54 so that rotors 54 and second gear 46 will rotate in unison. Gear teeth 78 extend radially from the bottom portion of second gear 46. The diameter of second gear 46 is larger than the diameter of first gear 44 as seen in FIG. 7. Referring back to FIGS. 3 and 5, gear teeth 78 are adapted to engage with cluster gears 72 which will be more fully described below. The bottom portion of second gear 46 is rotatably mounted and rests on the top portion of gear teeth 68. It should be understood that the diameter of second gear 46 is preferably larger than the diameter of first gear 44, therefore the second gear 46 is the high-speed gear and first gear 44 is the low-speed gear. It is within the scope of this invention to use gears of varying size to change the gear ratios of device 10 and to make the diameter of the first gear larger than the diameter of the second gear.

As best seen in FIGS. 1 and 5–7, the present invention preferably includes three cluster or compound gears 72 that are in constant mesh with first and second gears 44, 46. Each cluster gear 72 includes a large and small gear 80, 82 that are fixedly mounted to one another. Cluster gears 72 are equidistantly positioned from one another and rotatably mounted on a primary carrier 84. Cluster gears 72 are in mesh with and positioned around first and second gears 44, 46 to keep shaft 70 centered with input shaft 14. It should be understood and appreciated that more or less than three cluster gears may be used in the construction of the invention as long as shaft 70 is kept in alignment with input shaft 14. Cluster gears 72 are rotatably mounted on carrier 84 by shafts 89 which are fixedly mounted on primary carrier 84. Specifically, as seen in FIG. 7, large gear 80 has gear teeth 86 that are in constant mesh with gear teeth 68 on first gear 44. Referring to FIG. 5, small gear 82 includes gear teeth 88 that are in constant mesh with gear teeth 78 on second gear 46. In addition, small gear 82 is also in constant mesh with a ring gear 90. Ring gear 90 is fixedly mounted on the inner portion of casing 12 and is positioned to be in constant mesh with small gear 82 around the inner circumference of casing 12.

Figure 6:
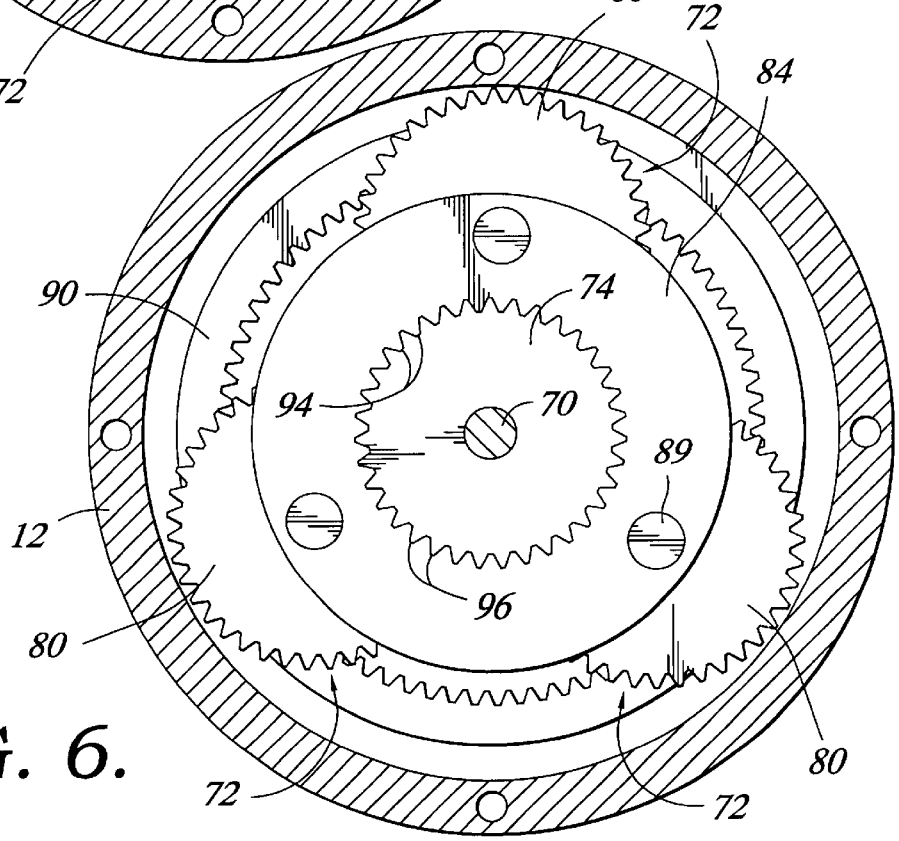
FIG. 6 is a cross-sectional view of the present invention taken along line 6—6 of FIG. 1 showing the sun gear in mesh with the primary carrier.
Figure 7:
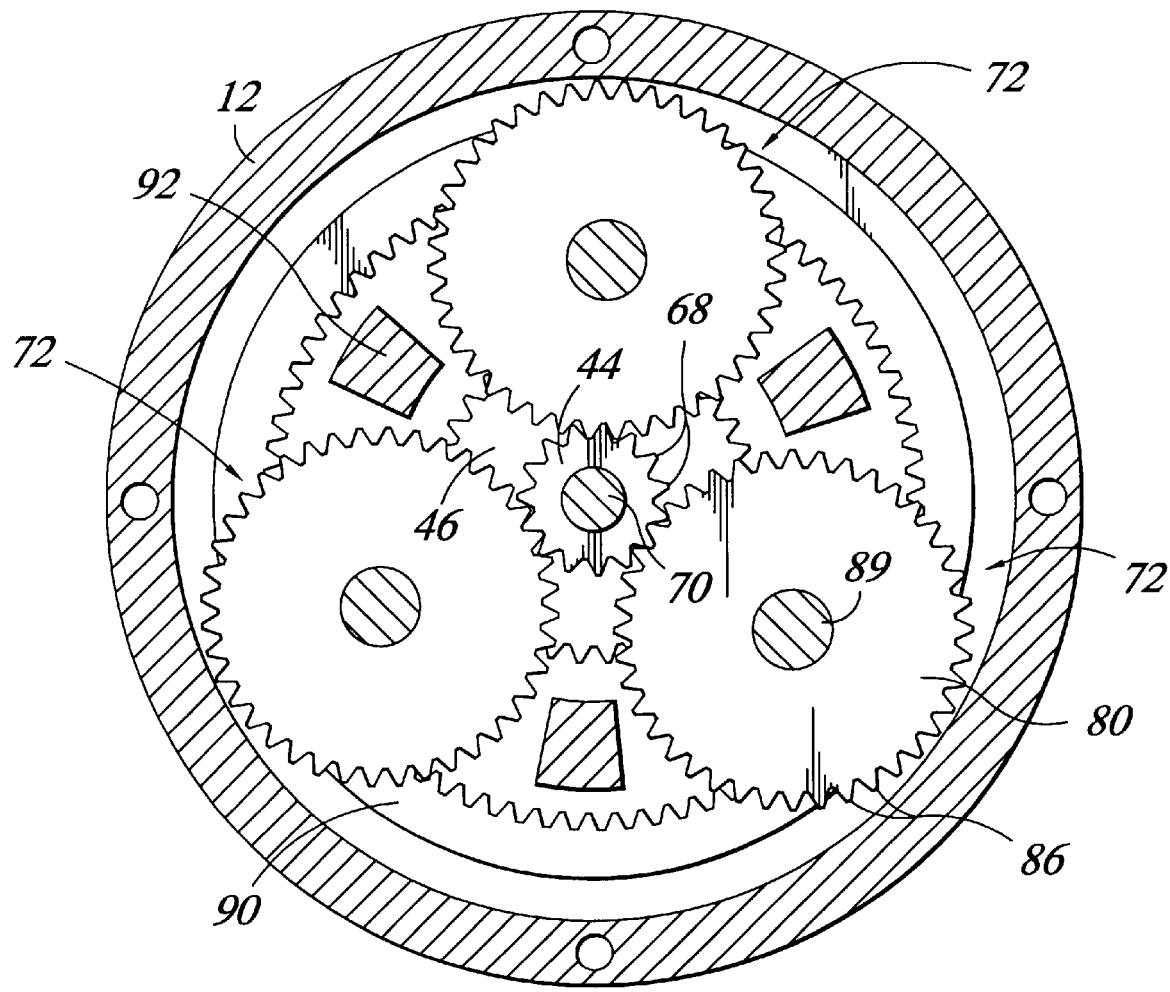
FIG. 7 is a cross-sectional view of the present invention taken along line 7—7 of FIG. 1 showing the first gear in mesh with the large gear.

As best seen in FIGS. 5 and 6, primary carrier 84 is disc-shaped with an aperture positioned through its center adapted to fit around sun gear 74. A plurality o flanges extend upwardly from carrier 84 and are positioned between each cluster gear 72. Carrier 84 includes splines 94 on its inner circumference and adapted to mesh with splines 96 formed in sun gear 74. Carrier 84 along with cluster gears 72 are adapted to orbit or rotate around first and second gears 44, 46. As best seen in FIG. 1, the bottom portion of carrier 84 rests and is supported by a second carrier 98. A set of bearings 100 are positioned between the primary carrier 84 and secondary carrier 98 to reduce the friction that is produced when one or both of the carriers 84, 98 are in motion. Bearings 100 allow the carriers 84, 98 to move freely and independently of one another.

As best seen in FIG. 1, the present invention is then coupled to output shaft 16. Sun gear 74 is cylindrically-shaped having top and bottom portions. The aperture extends vertically though sun gear 74 and is sized to accept the bottom portion of first gear 44 as best illustrated by FIGS. 1 and 6. First gear 44 and sun gear 74 rotate independently of one another. Splines 94 on primary carrier 84 are coupled to splines 96 on the top portion of sun gear 74. Referring back to FIG. 1, the bottom portion of sun gear 74 also has gear teeth 102 that mate with gear teeth 104 on each planet gear 106. Gear teeth 102 are also in constant mesh with a ring gear 108 that is fixedly coupled to the inside of casing 14. Three planet gears 106 are equidistantly positioned around sun gear 74 to center sun gear 74 with shaft 14. Additionally, planet gears 106 are mounted on shafts 110 that extend upwardly from secondary carrier 98. Secondary carrier 98 rests on the bottom of casing 12 and is capable of rotating around sun gear 74. Secondary carrier 98 also includes splines, not shown, that are adapted to engage a series of grooves 112 formed on output shaft 16 as best illustrated in FIG. 1. Therefore, secondary carrier 98 is adapted to rotate output shaft 16. Output shaft 16 extends downwardly from casing 12 and is adapted to be coupled to the drill bit on the auger or any other type of machine part that is driven by output shaft 16.

In operation, device 10 is shifted between a low and high speed in forward or reverse while under load by selectively activating or deactivating an actuator device 40. Preferably, a one-speed motor, not shown, operates to rotate input shaft 14 at a specified rate of speed. Splines located on shaft 14 and splines 28 on housing 18 are in constant mesh, therefore housing 18 rotates at the same rate of speed as shaft 14. In addition, since selector plate 38 is coupled to housing 18 by springs 32, plate 38 is also rotating at the same rate of speed as shaft 14. Further, first and third set of rotors 48, 52 are coupled to posts 24, therefore rotors 48, 52 also rotate at the same rate of speed as shaft 14.

The operational speed of device 10 depends on whether first or second gear 44, 46 is engaged. First gear 44, or low speed-gear, is the default gear as described in the preferred embodiment and is best illustrated by FIG. 3. First gear 44 is engaged as a default position and is engaged when springs 32 apply an upward force to bias plate 38 toward top portion 20 of housing 18 and actuator device 40 is not activated to apply a downward force on selector plate 38. Selector plate 38 applies an upward force against first and second set of rotors 48, 50. The upward force applied by selector plate 38 forces first and second rotors 48, 50 to move against one another so that they are removably coupled to one another by the friction force created between rotors 48, 50. Since first rotors 48 are rotating at the same rate of speed as input shaft 14, and first rotors 48, second rotors 50 are fixedly coupled to one another through the aid of friction material 58, second rotors 50 also move at the same rate of speed as input shaft 14. Therefore, second rotors 50 begin to rotate and that rotation is transferred through input adapter 56 to first gear 44.

As best seen in FIG. 7, first gear 44 proceeds to rotate and causes large gear 80 located on each cluster gear 72 to rotate. Referring to FIG. 1, each large gear 80 and small gear 82 are fixedly mounted to one another therefore small gear 82 rotates along with large gear 80. As best seen in FIGS. 1, 3 and 5, the constant mesh between small gear 82 and ring gear 90 causes primary carrier 84 and cluster gears 72 to orbit around first and second gears 44, 46.

When first gear 44 is engaged, second gear 46 rotated freely about shaft 70. As best seen in FIGS. 1 and 5, small gear 82 is in constant mesh with second gear 46, therefore, second gear 46 is rotating freely about shaft 70. As second gear 46 is rotating freely about shaft 70, the fourth set of rotors 54 are rotating along with second gear 46. The third set of rotors 52 are rotating at the input speed, which is a different rate of speed compared to the rotational speed of fourth set of rotors 54. Since third and fourth set of rotors 52, 54 are not engaged with one another, they slide against one another due to their differing rates of speed.

The rotation of the primary carrier 84 of device 10 is transferred to output shaft 16 and ultimately to drive the auger drill bit. Specifically, as best seen in FIG. 6, the rotation of primary carrier 84 is transferred through sun gear 74 so that sun gear 74 and primary carrier 84 rotate in unison. Referring to FIG. 1, sun gear 74 transfers its rotation to each planet gear 106 so that all three planet gears 106 begin to rotate about shaft 110. The mesh between planet gears 106 and outside gear 108 causes secondary carrier 98 to rotate around sun gear 74. Secondary carrier 98 rotates around sun gear 74 and rotates output shaft 16. The first or low speed gear 44 power path is used as a default position, preferably for digging, until actuator device 40 is activated and applies a downward force on selector plate 38 to a second or high speed gear 46.

Figure 4:
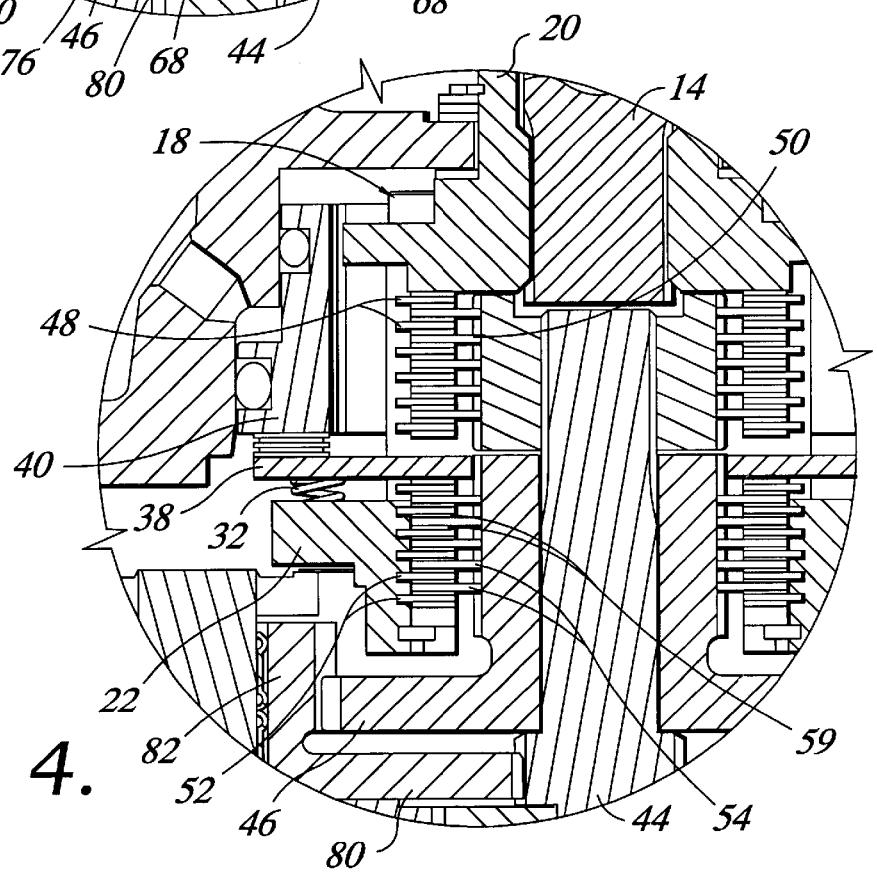
FIG. 4 is an enlarged view taken from FIG. 1 showing the clutch mechanism engaging the second gear.

In the alternative, device 10 can be shifted to second or high speed-gear 46 by activating an actuator device 40. As best seen in FIGS. 1 and 4, once actuator device 40 is activated, it applies a downward force on selector plate 38 to oppose the upward bias applied by springs 32. Actuator device 40 is applying a downward force that is greater than the upward bias exerted by springs 32 to move selector plate 38 downwardly toward the bottom portion 22 of housing 18. As the actuator device 40 pushes downwardly on selector plate 38, retaining ring 31 is forced against thrust bearings 30 and prevent housing 18 from moving downwardly and becoming dislodged from housing 18. Further, the downward force applied by selector plate 38 forces third and fourth rotors 52, 54 to move against one another so that they are removable coupled to one another by the friction force created between rotors 52, 54. Since third rotors 52 are rotating at the same rate of speed as input shaft 14, and third and fourth rotors 52, 54 are fixedly coupled to one another, fourth rotors 54 also rotate at the same rate of speed as input shaft 14.

As fourth rotors 54 are rotating, they connect with second gear 46 causing gear 46 to rotate. As best seen in FIG. 4, second gear 46 proceeds to rotate and causes small gear 82 on each cluster gear 72 to rotate. The constant mesh between small gear 82 and ring gear 90 causes primary carrier 84 and cluster gears 72, to rotate or orbit around first and second gears 44, 46 as best seen in FIG. 1. Because second gear 46 has a larger diameter than first gear 44, the resulting rotation of primary carrier 84 around first and second gears 44, 46 will be faster than when first gear 44 was rotating the primary carrier 84. The increased rate of rotation around first and second gears 44, 46 results in more speed transferred to output shaft 16.

When second gear 46 is engaged, first gear 44 rotates freely about shaft 70. Referring back to FIG. 4, as small gear 82 is rotating with second gear 46, large gear 80 is also rotating since the large 80 and small 82 gears are fixedly coupled to one another. Large gear 80 is in constant mesh with first gear 44, therefore, first gear 44 is also rotating freely within second gear 46. As first gear 44 is rotating, the second set of rotors 50 are rotating along with first gear 44. First set of rotors 48 are rotating at the input speed, which is a different rate of speed compared to the rotational speed of second set of rotors 50. Since first and second rotors 48, 50 are not engaged with each other, they slide against one another due to their different rates of speed.

The rotation of the primary carrier 84 of device 10 is transferred to output shaft 16 and ultimately to drive the auger drill bit in the same fashion as when first gear 44 was engaged, but this time, the rotation of each of the following members will be rotating at an increased rate of speed due to the difference in diameter between first and second gears 44, 46. As best seen in FIGS. 1 and 6, the rotation of primary carrier 84 is transferred through sun gear 74 so that sun gear 74 and primary carrier 84 rotate in unison. Referring to FIG. 1, sun gear 74 transfers its rotation to each planet gear 106 so that all three planet gears 106 begin to rotate about shaft 110. The mesh between planet gears 106 and outside gear 108 cause secondary carrier 98 to rotate around sun gear 74. Secondary carrier 98 rotates around sun gear 74 and rotates output shaft 16. The second or high-speed gear 46 power path is followed until actuator device 40 is deactivated. When actuator device 40 is deactivated, springs 32 bias plate 38 upwardly and return plate 38 to the default position engaging first gear 44 as previously described and shown in FIG. 3.

Device 10 can also be shifted between a low and high speed in reverse while under load by selectively activating or deactivating an actuator device 40. The operation of device in the reverse direction is functionally the same as in a forward direction as previously described except that input shaft 14 rotates in the opposite direction thereby causing the rotation of housing 18, clutch mechanism 26, first gear 44, second gear 46, cluster gears 72 and planetary carrier 84 to also rotate in the opposite direction. Therefore, it should be understood from the principles of the present invention that output shaft 16 will also rotate in the opposite or reverse direction at the operational speed corresponding to either the first gear 44 or second gear 46.

Constructed and operated as previously described, the invention provides a shiftable compound planetary transmission for an auger that is of relative simple construction and easily assembled onto auger machines. Additionally, the present invention provides a transmission that has a one step process for shifting gears while under loading. Further, the present invention provides a transmission with a cluster gear that rotates around the first and second gears to increase power output of the auger. The planetary cluster gears allow for a relatively large ratio difference between the first and second gears when compared to prior art transmission drives. The present invention also provides a transmission of relatively light weight and small size. These features have substantial advantages over those power transmission auger drives previously available.

From the foregoing, it will be seen that this invention is one well-adapted to attain the ends and objects hereinabove set forth together with other advantages which are obvious and inherent to the device. It will be understood that certain features and subcombinations are of utility and may be employed without reference to other features and subcombinations. This is contemplated by and within the scope of the claims. Since many possible embodiments may be made of the invention without departing from the scope thereof, it is to be understood that all matter herein set forth or shown in accompanying drawings is to be interpreted as illustrative and not in a limiting sense.

We claim:

1. A power transmission device capable of shifting the operating speed of a machine while under load, the machine includes a casing, a input shaft and an output shaft, said device comprising:
    a clutch mechanism operably associated with the input shaft;
    a primary carrier located within the casing and operably coupled to rotate the output shaft;
    a cluster gear, said cluster gear is coupled to said primary carrier;
    a ring gear, said ring gear coupled to the casing and is in mesh with said cluster gear;
    a first gear, said first gear is rotatably mounted within the casing and is in mesh with said cluster gear;
    a second gear, said second gear is rotatably mounted on said first gear and is in mesh with said cluster gear, wherein said clutch mechanism is adapted to selectively engage one of said first gear and said second gear, and wherein said cluster gear is adapted to rotate around said first and second gears when one of said first gear and said second gear is engaged thereby rotating the output shaft at the operating speed corresponding to the engaged gear.

2. The device as recited in claim 1, wherein said cluster gear includes a large gear and a small gear.

3. The device as recited in claim 2, wherein said small gear is in mesh with said second gear.

4. The device as recited in claim 3, wherein said small gear is in mesh with said ring gear.

5. The device as recited in claim 1, wherein said clutch mechanism comprises:
    a first rotor operatively coupled to rotate with the input shaft;
    a second rotor coupled to said first gear, said second rotor and said first gear are adapted to rotate along with one another;
    a third rotor operatively coupled to rotate with the input shaft;
    a fourth rotor coupled to said second gear, said fourth rotor and said second gear are adapted to rotate along with one another;
    a selector plate operably coupled with the input shaft and positioned between said first and third rotors, wherein said selector plate is adapted to selectively engage said first rotor with said second rotor, or said third rotor with said fourth rotor thereby engaging one of said first gear and said second gear respectively.

6. The device as recited in claim 5, further including a friction material positioned between said first rotor and second rotor.

7. The device as recited in claim 5, further including a friction material between said third rotor and said fourth rotor.

8. The device as recited in claim 5, further including a spring coupled to said selector plate, wherein said spring biases said selector plate to engage one of said first gear and said second gear.

9. The device as recited in claim 8, further comprising an actuator device that operates to counteract the bias of said spring and move said selector plate to engage the opposite gear.

10. The device as recited in claim 9, wherein said actuator device is a piston.

11. The device as recited in claim 5, further comprising an input adapter adapted to be coupled to said first gear and said second rotor.

12. The device as recited in claim 1, further comprising a plurality of cluster gears rotatably coupled to said primary carrier.

13. The device as recited in claim 1, further comprising a ring gear that is fixedly coupled to the casing wherein said small gear is in mesh with said ring gear.

14. The device as recited in claim 1, further including a housing coupling the input shaft with said clutch mechanism.

15. A power transmission device for shifting the operating speed of a machine while under load where the machine includes a casing, an input shaft and an output shaft, said device comprising:

a first gear, said first gear is rotatably mounted within the casing and is in mesh with a cluster gear;

a second gear, said second gear is rotatably mounted on said first gear and is in mesh with said cluster gear;

said cluster gear that is coupled to the casing and in mesh with said first gear and said second gear;

engaging means that is operably associated with the input shaft and adapted to selectively engage either said first or second gear;

means for allowing said cluster gear to rotate around said first and second gears, wherein one of said first gear and said second gear is engaged thereby rotating the output shaft at the operating speed corresponding to the engaged gear.

16. The device as recited in claim 15, further including an input adapter that is coupled to said first gear and said engaging means.

17. The device as recited in claim 15, wherein said engaging means is activated by an actuator device.

18. The device as recited in claim 17, wherein said actuator device is a piston.

19. The device as recited in claim 15, further comprising a plurality of cluster gears that are rotatably coupled to the casing and associated with the output shaft.

20. The device as recited in claim 15, further comprising a housing coupling the input shaft with said engaging means.

21. The device as recited in claim 15, wherein said cluster gear includes a large gear and a small gear.

22. The device as recited in claim 21, wherein said large gear is in mesh with said first gear, and said small gear is in mesh with said second gear.

23. A method for shifting the operating speed of a machine while under load through the use of a transmission device, the machine includes a casing, an input shaft and an output shaft, said device includes a primary carrier, a cluster gear, a ring gear, a first gear and a second gear, wherein said primary carrier is located within the casing and operably coupled to rotate the output shaft, wherein said cluster gear is coupled to said primary carrier, wherein said ring gear coupled to the casing and is in mesh with said cluster gear, wherein said first gear is rotatably mounted within the casing and is in mesh with said cluster gear, wherein said second gear is rotatably mounted on said first gear and is in mesh with cluster gear, wherein a clutch mechanism is adapted to selectively engage one of said first gear and said second gear, and wherein said cluster gear is adapted to rotate around said first and second gears when one of said first gear and said second gear is engaged thereby rotating the output shaft at the operating speed corresponding to the engaged gear, said method comprising the steps of:

rotating the input shaft;

engaging the clutch with one of the first gear and second gear;

rotating the cluster gear around the first and second gears; and rotating the output shaft at the operating speed corresponding to the engaged gear.

* * * * *